UNITED STATES PATENT OFFICE.

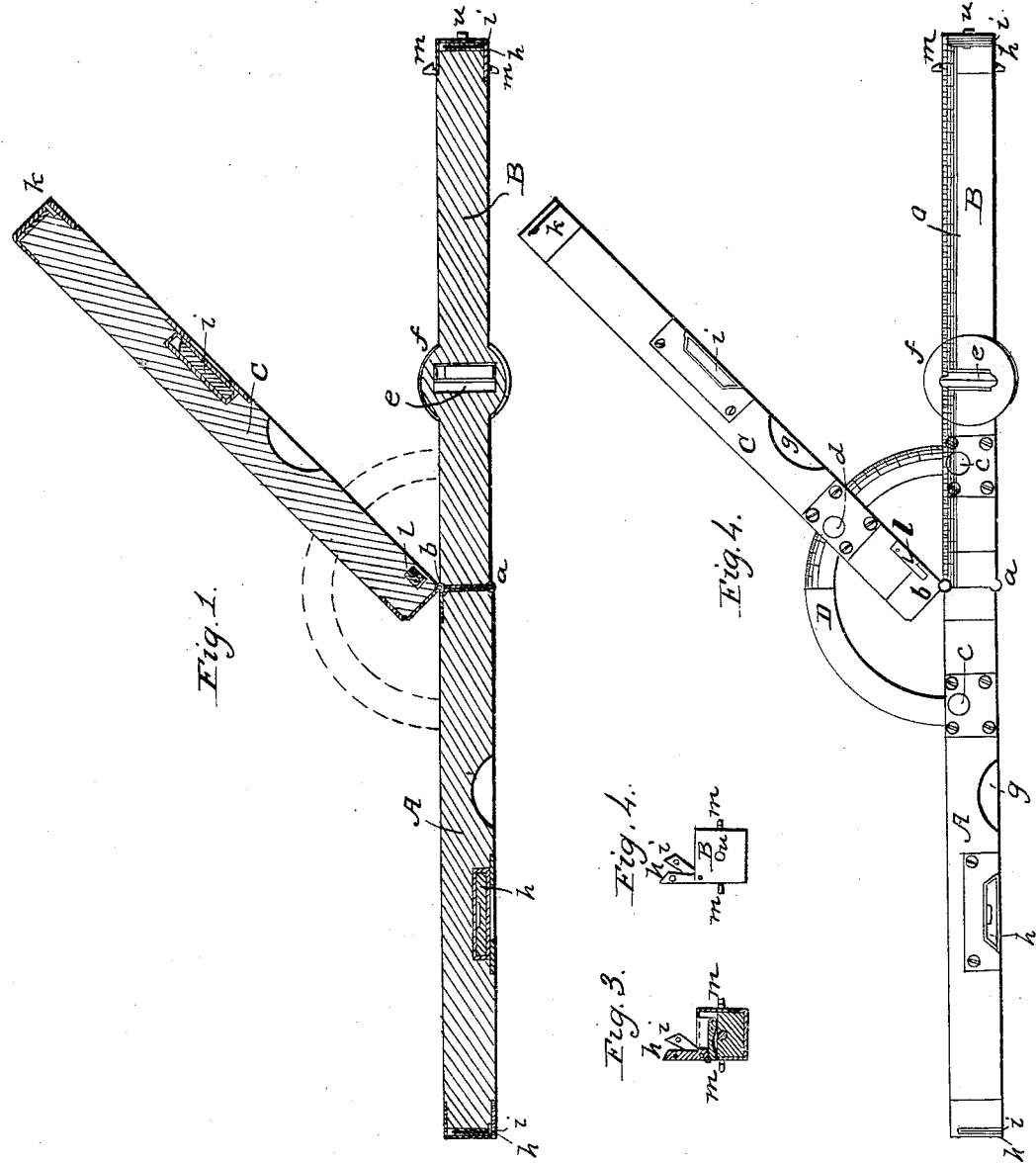

AARON CHASE, JR., OF SOMERVILLE, MASSACHUSETTS, ASSIGNOR TO HIMSELF AND TIMOTHY HOWE, OF SAME PLACE.

IMPROVEMENT IN INCLINOMETERS.

Specification forming part of Letters Patent No. 49,675, dated August 29, 1865.

*To all whom it may concern:*

Be it known that I, AARON CHASE, Jr., of Somerville, in the county of Middlesex and State of Massachusetts, have invented a new and useful or Improved Inclinometer or Angle-Meter; and I do hereby declare the same to be fully described in the following specification and represented in the accompanying drawings, of which—

Figure 1 is a side view of it as opened; Fig. 2, a longitudinal section of it; Fig. 3, a transverse section of one of its bars, taken through one of the end sights.

My invention is intended either for laying off or measuring angles, whether in horizontal or vertical planes, or for leveling and plumbing objects; and for such purposes its methods of use will be apparent to most artisans, especially to masons and carpenters, for whom it is more particularly intended.

It consists principally of three bars, A B C, and a curved arc, D, hinged together and provided with spirit-levels and sights, in manner as hereinafter described.

The two bars A B are hinged together by a rule-joint at $a$, while the bar C is similarly hinged to the bar B at $b$, so that the three bars may be folded together edge to edge, and with the bar B between the two bars A and C, or so that the two bars A B may be arranged in a straight line with each other, and the bar C be movable to a position in which it will be at right angles to the other bars.

The two bars A B are provided with mortises for receiving the ends of the arc D and holding it in position with respect to them, as shown in Fig. 1, there being a clamp-screw, $c$, to each of the said mortises, and to hold the arc to the said bars A B. The arc D goes through the bar C, which is provided with a clamp-screw, $d$, for clamping the bar at a right angle or an acute angle with the bar B. For the determination of such angle the arc D may be divided into degrees and parts of a degree. The bar B is provided with a spirit-level, $e$, arranged across it and in a box, $f$, fixed in it, each of the other bars having a recess, $g$, made in it to receive the projecting parts of the box when the three bars are folded together. There is also a spirit-level, $h$ or $i$, applied to each of the bars A C, and arranged therein in manner as shown in the drawings. I would remark, however, that there may be another spirit-level arranged in the opposite edge of either or each of the bars A C, in which case the instrument would be of more general use as an inclinometer or measurer of ramps or slopes. Near the outside end of each of the two bars A B there is applied to the bar two sights, which are hinged to the bar so as to be capable of being turned out of or into the sockets made transversely in the bar to receive them. Fig. 4 shows a pair of these sights as turned out of the bar. One of them has a simple eye-hole made through it, while the other has a larger orifice with a hair or wire stretched across it. There is also such a sight as that last mentioned applied to the outer end of the bar C, it being shown at $k$. At or near the inner end of the bar C there is another sight, $l$, formed with an eye-hole through it, each of the said sights being so applied to its bar as to be capable of being turned down flush with, or brought up to a right angle with, the surface of the bar. Furthermore, the bar B, near its outer end, may have a double spring-catch, $m$, to lock it to either or both of the other bars when closed against the same, the catch being operated or forced inward, in order to unlatch the bars, by pressing the finger on a knob or slider, $n$, projecting from the catch and out of the end of the bar B.

There may be one or more divided scales applied to each or either of the bars, if desirable, one being exhibited at $o$ as applied to the bar B.

Having thus described my invention, what I claim, and desire to have secured by Letters Patent, is as follows:

The improved angle-meter or inclinometer, made substantially as described—viz., of the three bars A B C and the arc D, arranged and applied together and provided with levels and sights, as specified.

AARON CHASE, JR.

Witnesses:
R. H. EDDY,
F. P. HALE, Jr.